United States Patent [19]

Klee et al.

[11] Patent Number: 4,697,484
[45] Date of Patent: Oct. 6, 1987

[54] ROTATING DRILLING HEAD

[76] Inventors: Gerhard Klee, Fuchshohl 102, D6000 Frankfurt/Main; Wilfried Gerk, Amselstr. 10, D6074 Roedermark; Norbert Jeschke, Breslauerstr 3, D6057 Dietzenbach-Hexenberg, all of Fed. Rep. of Germany

[21] Appl. No.: 776,160

[22] Filed: Sep. 13, 1985

[30] Foreign Application Priority Data

Sep. 14, 1984 [DE] Fed. Rep. of Germany ....... 3433793

[51] Int. Cl.$^4$ .......................................... B23B 29/034
[52] U.S. Cl. ...................................... 82/1.5; 279/1 C; 408/143; 408/235; 408/159
[58] Field of Search ............... 408/158, 159, 143, 235; 82/1.5, 1.2; 279/1 C

[56] References Cited

U.S. PATENT DOCUMENTS

| 2,734,402 | 2/1956 | Hoern | 82/1.5 |
| 3,592,553 | 7/1971 | Heizer | 408/124 |
| 3,864,054 | 2/1975 | Eysel | 408/147 |

FOREIGN PATENT DOCUMENTS

| 2034601 | 3/1977 | Fed. Rep. of Germany . | |
| 0677818 | 8/1979 | U.S.S.R. | 82/1.2 |

Primary Examiner—Z. R. Bilinsky
Attorney, Agent, or Firm—Hill, Van Santen, Steadman & Simpson

[57] ABSTRACT

A rotating head or the like having a drilling spindle and a tool carrier with an arrangement to finely adjust the tool carrier in a direction transverse to the axis of rotation of the spindle characterized by a wedge carrier which is mounted on the spindle for movement along the axis of rotation and has a bevel engaging a sliding surface of the tool carrier to shift the carrier transverse to the axis of rotation in response to movement of the wedge carrier and an arrangement for maintaining contact between the sliding surface and the bevel of the tool carrier preferably including the center of gravity of the tool carrier being offset relative to the axis of rotation on a side opposite the sliding surface so that centrifugal forces occurring during rotation of the rotating head press the sliding surface against the bevel.

18 Claims, 8 Drawing Figures

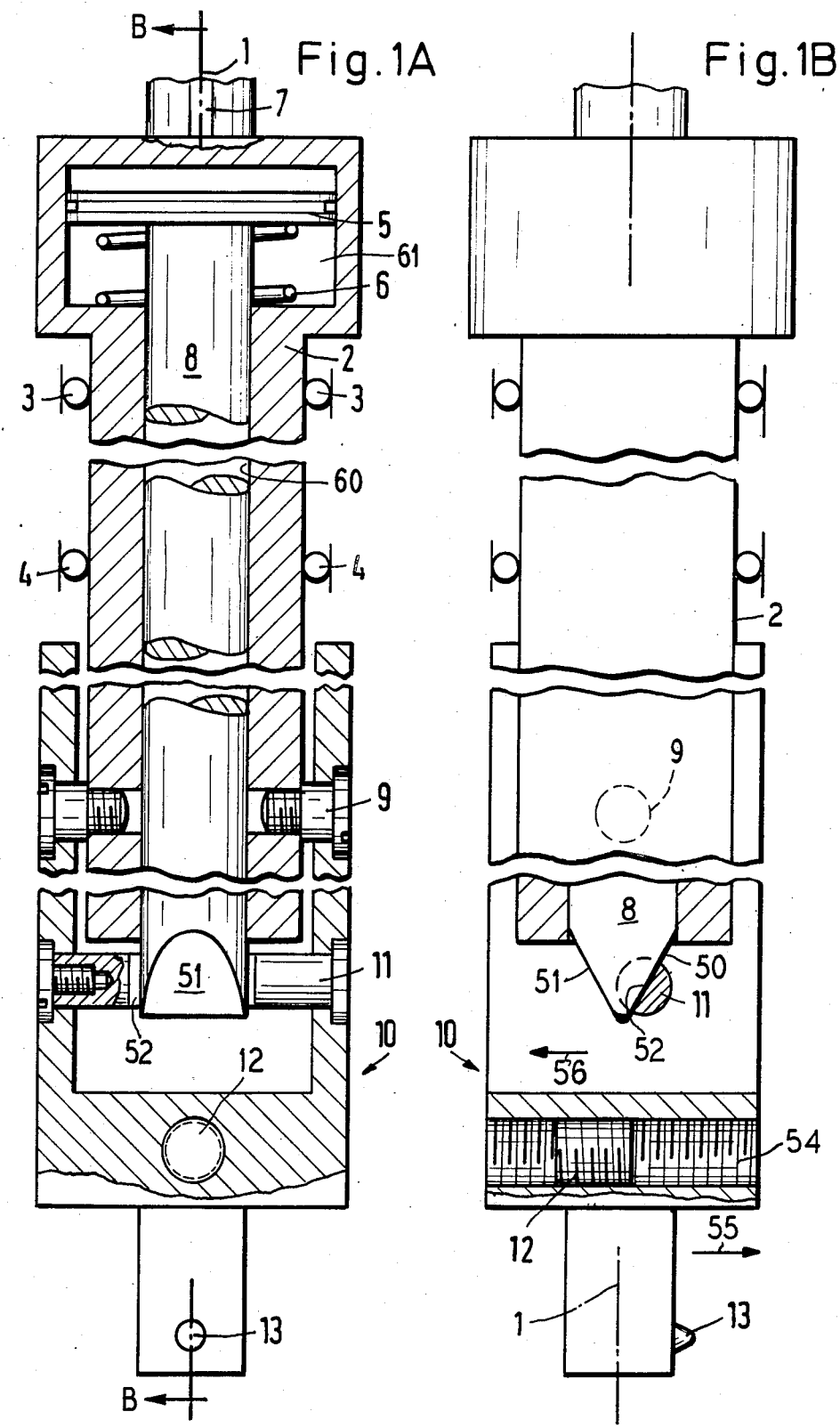

ROTATING DRILLING HEAD

BACKGROUND OF THE INVENTION

The present invention is directed to a rotating drilling head having a drilling spindle which is rotated on an axis of rotation, a tool carrier, an arrangement for mounting the tool carrier on the end of the spindle including means for finally adjusting the position of the tool carrier transverse to the axis of rotation.

SUMMARY OF THE INVENTION

It is the object of the present invention to provide a rotating drill head of the above-mentioned type, which head has reduced imbalance and in which the centrifugal forces cannot cause unwanted adjustment or movement of the tool carrier relative to the spindle.

To accomplish these goals, the invention is directed to an improvement in a rotating head or the like having a drill spindle, which is to be rotated on an axis of rotation, a tool carrier, means for attaching the tool carrier on the end of the spindle including means for finely adjusting the position of the tool carrier transversely to the axis of rotation of the spindle. The improvements are that the means for finely adjusting includes a wedge carrier having at least one bevel being mounted for movement along the axis of rotation of the spindle, means for shifting the wedge carrier relative to the spindle, and a sliding surface being provided on the tool carrier and coacting with the bevel of the wedge carrier to adjust the transverse position of the tool carrier relative to the spindle, and said tool carrier having means for urging the sliding surface against the bevel. The means for urging is preferably that the center of gravity of the tool carrier is offset from the axis of rotation of the spindle so that the centrifugal forces, which occur during rotation of the drilling head, press the sliding surface of the tool carrier against the bevel of the wedge carrier.

Preferably, the tool carrier includes means for transversely adjusting the position of the center of gravity of the tool carrier relative to the axis of rotation. This means for adjustment can be a cylinder having external threads being threaded into a tapped bore extending transverse to the axis of rotation in the tool carrier. In another embodiment, the means for adjusting the center of gravity can include a pivotally mounted member biased by a spring arrangement against the wedge carrier.

The sliding surface can be on a rod which is positioned in an eccentrically disposed bore in the tool carrier. Preferably, the rod has a segmented recess to provide the sliding surface for engaging the bevel of the wedge carrier. In another embodiment, the sliding surface can be a surface of a nosepiece or wedge-shaped projection which is provided on the tool carrier. In all instances, to prevent forces of the sliding surface engaging the bevel to create a force to shift the wedge carrier axially, the inclination of the bevel is provided so that axial components are prevented and a self-locking of the wedge carrier is produced.

The tool carrier can be attached to the spindle around a single pivot axis. In another embodiment, the tool carrier is a link or member which is connected by a parallel linkage cranks to the drilling spindle. In yet another embodiment, the tool carrier is formed by two unconnected movable parts, each of which has a sliding surface and the wedge carrier has a pair of oppositely facing bevels engaging the two sliding surfaces. Each of the parts has a center of gravity which is positioned eccentrically to the side of the tool carrier which is remote from the bevel engaged by the sliding surface of that part. It is possible that one of these two parts will carry the tool while the other part will carry a balancing plate. In an alternative form, each of the moving parts can carry a tool.

The means for shifting the wedge carrier in the spindle can be either a hydraulic or pneumatic pressure acting on a piston which is received in a cylinder and also acted on by a compression spring that opposes this hydraulic or pneumatic pressure. It is also possible that the wedge carrier can be moved toward and away from the tool carrier by an electric motor such as a stepping motor or a linear motor.

While the tool can be directly mounted on the tool carrier, it is also possible for a known rapid tool changing system to be provided.

Other features and advantages of the invention will be readily apparent from the following description, drawings and claims directed to the various embodiments of the invention.

BRIEF DESCRIPTION OF THE DRAWINGS

FIG. 1A is a longitudinal cross-sectional view with portions in elevation for purposes of illustration of a drilling head in accordance with the present invention;

FIG. 2 is a cross-sectional view with portions in elevation taken along the line B—B of FIG. 1A;

DESCRIPTION OF THE PREFERRED EMBODIMENTS

Figure 2A:
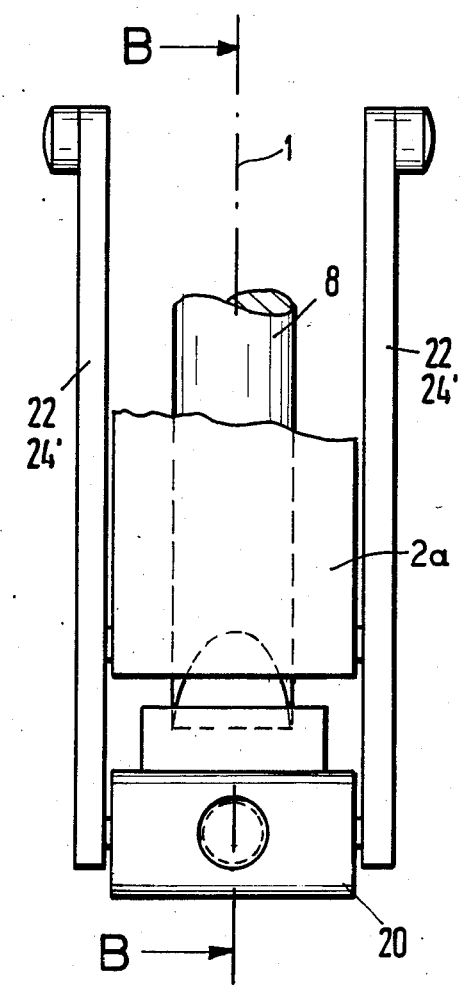
FIG. 2A is a longitudinal side view of a portion of an embodiment of a drilling head in accordance with the present invention.

The principles of the present invention are particularly useful when incorporated in a drilling head illustrated in FIGS. 1 and 2. The drilling head in FIGS. 1 and 2 has a drilling spindle 2, which is symmetrical around an axis 1 of rotation. The spindle is mounted in a drilling machine by a ball bearing arrangement of ball bearings 3 and 4 which are only schematically illustrated so that the spindle can rotate on the axis 1. The spindle 2 has an axially extending bore 60 which receives a wedge carrier 8 which can be displaced along the axis 1. The carrier 8 at an upper end is provided with means for shifting the wedge carrier 8 along the axis. As illustrated, this means comprises a piston 5 secured to an end of the carrier 8 which is received in a cylinder 61 and biased upward by a spring 6. Fluid, either hydraulic or pneumatic, is applied through a line 7 to act on the piston to urge the piston 5 and carrier 8 downward against the force of the spring 6. The carrier 8 at an end opposite the piston 5 has a V-shaped wedge forming a pair of oppositely facing bevel surfaces or bevels 50 and 51.

At a lower end of the spindle 2, a tool carrier 10 is pivotally connected by pivot pins 9 to pivot on the axis formed by these pins. The tool carrier is shaped so that the mass of the tool carrier 10 above the axis formed by the pins 9 corresponds to the mass of the tool carrier 10 which extends below these pins. The tool carrier includes a slide member 11 which is illustrated as being in the form of the rod that has a segmented recess forming a flat inclined sliding surface 52 which engages a bevel 50 of the wedge carrier 8. Thus, when pressure is applied to the piston 5, the wedge is pressed against the member 11 so that the tool carrier 10 pivots around the pivot pins 9 in the direction of arrow 55 (FIG. 1B) and a tool 13 secured to the tool carrier 10 is adjusted relative to the axis 1 of rotation.

The tool carrier 10 has a threaded bore 54 (FIG. 1B), which extends transverse to the axis of rotation 1 and transverse to the axis of the member 11. A heavy member 12, which is a cylindrical member with external threads, is threadably received in the bore 54. The effect of the heavy member 12 is to insure that a center of gravity of the tool carrier 10 is disposed eccentrically on a side of the tool carrier 10 which is remote from the point of contact between the bevel 50 and the surface 52. With the center of gravity thus disposed, centrifugal forces cannot cause a further shifting of the tool carrier 10 in the direction 55 and instead press the sliding surface 52 of the member 11 inwardly toward the axis of rotation 1 and against the bevel surface 50. In contrast to the prior art, the centrifugal forces cannot cause unwanted over-adjustment. Even if the adjustment of the tool carrier 10 is relatively considerable, the member 12 still insures that the center of gravity is disposed on the distal side of the axis 1 as seen from the surface 52 of the member 11. Therefore, the sliding surface 52 of the member 11 is pressed in the direction of arrow 56 onto the bevel 50. Conveniently, means such as a spring 44 illustrated in FIG. 4 or magnets can be provided to insure that when the drilling head is stationary and not being rotated, the tool carrier 10 is retained with small but adequate force in the direction 56 and in positive or non-positive engagement with the wedge carrier 8.

The proposed construction of the tool carrier also insures that the centrifugal forces occurring from the shifting of the tool carrier 10 and acting on the bearings 3 and 4 are relatively reduced since the center of gravity of the tool carrier is also near the axis of the connecting pins 9. In this embodiment, the only uncompensated centrifugal forces are those occurring because the center of gravity of the tool carrier 10 must be disposed adjacent the rotational axis in order for the surface 52 of the member 11 to be pressed onto the bevel 50.

Figure 2B:
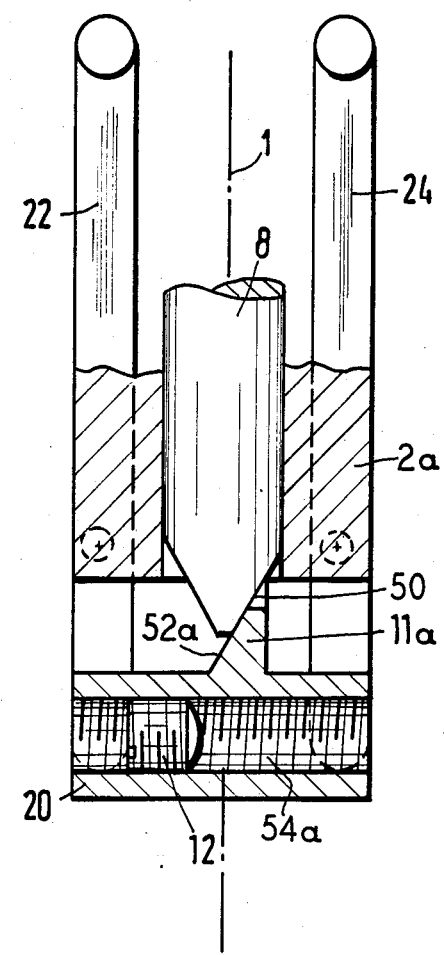
FIG. 2B is a cross-sectional view with portions in elevation and broken away for purposes of illustration taken along line B—B of FIG. 2A.

In an embodiment of the tool head illustrated in FIGS. 2A and 2B, the tool carrier takes the form of a link 20, which is connected by a parallel linkage to a drilling spindle 9a. As illustrated, the parallel linkage on each side of the link 20 includes two links or cranks 22, 24 which are pivotally connected to the spindle 9a and also to the link 20. In this embodiment, instead of having a pin member to form the sliding surface, a projection 11a in the form of a wedge or nosepiece is provided on the link 20 to form a flat inclined surface 52a for engaging a bevel 50 of the wedge carrier 8. As in the previous embodiment, the link has a transverse bore 54a, which receives a cylindrical member 12 which enables adjusting the center of gravity of the tool carrier relative to an axis 1 of rotation for the spindle.

The use of the parallel linkage has the advantage that the tool always moves parallel to itself in response to any deflection of the link 20. The action of the tool is therefore independent of its distance from the link 20.

The centrifugal forces transmitted by way of the sliding member 11 to the wedge carrier 8 oppose the adjustment force applied to the piston 5. Disturbances can be minimized if the compression spring 6 is of an adequate rigidity; preferably, however, the inclination of the bevels such as 50 and 50a as well as the inclination of the side surfaces 52 and 52a are such that the axial component is sufficiently small and the transverse component causes a self-locking of the carrier 8 in the bore 60 of the spindle.

Figure 3B:
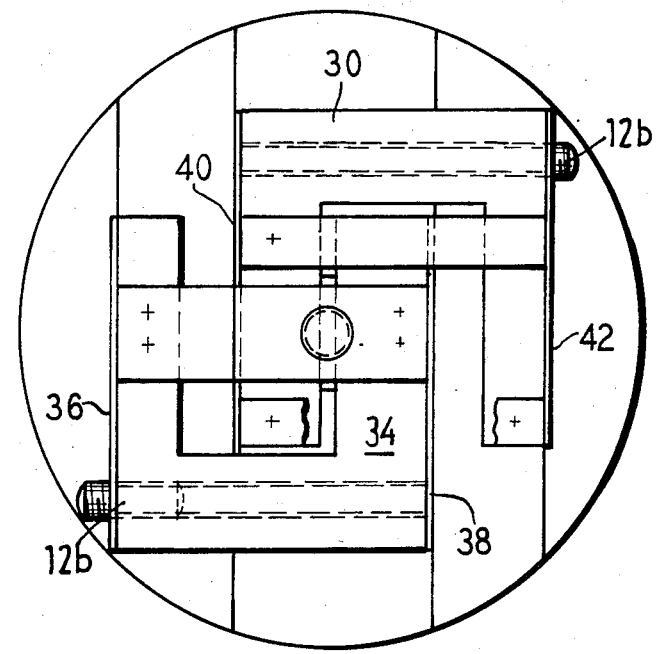
FIG. 3B is a bottom plan view of the embodiment of FIG. 3A.
Figure 3C:
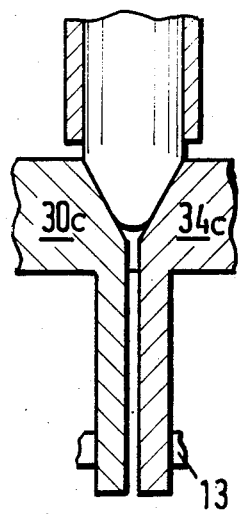
FIG. 3C is a partial cross-sectional view similar to FIG. 3A of a modification of the embodiment of FIG. 3A.
Figure 3A:
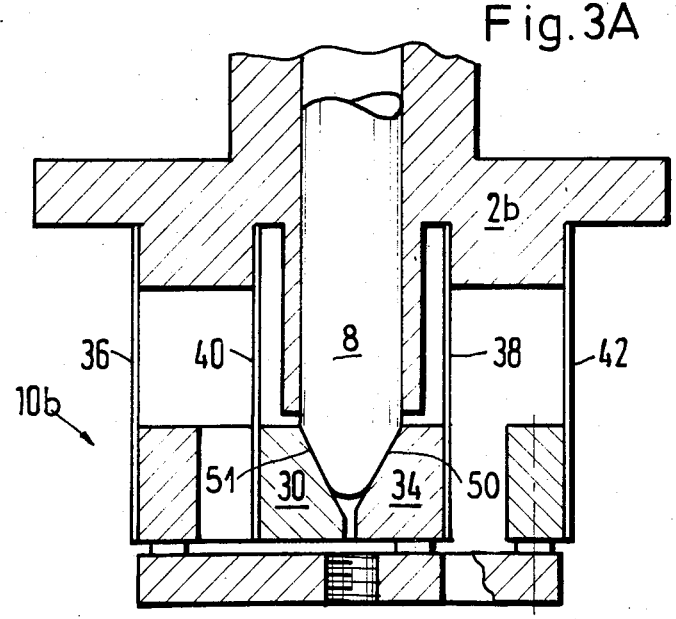
FIG. 3A is a partial cross-sectional view with portions in elevation of a third embodiment of a drilling head in accordance with the present invention.

Another embodiment of the drilling head according to the present invention is illustrated in FIGS. 3A and 3B. In this arrangement, a tool carrier 10b is in the form of two unconnected moving parts 30 and 34 which are pressed transversely outward from the axis 1 by the bevels 51 and 50 of the wedge carrier 8. As best illustrated in FIG. 3B, the two parts 30 and 34 are so shaped that the center of gravity of each part is disposed eccentrically on the side of the part which is remote from the bevel associated with the particular part concerned. For example, the center of gravity of the part 30 is on the side of the bevel 50 while the center of gravity for the part 34 is disposed on the side of the bevel 51. As illustrated, each of the parts 30 and 34 are provided with cylindrical members 12b, which can be adjusted in their respectively tapped bores. Thus, the centrifugal force is always directed toward and not away from the wedge carrier 8. In this embodiment, the moving part 30 is retained on the spindle 2b by strips 40 and 42, while the moving part 34 is retained on the spindle by strips 36 and 38.

A modification of the embodiment of FIGS. 3A and 3B is illustrated in FIG. 3C. In this modification, two parts 30c and 34c each have extensions which carry tools such as 13. Preferably, one is a roughening tool while the other may be a fine-turning or machining tool.

Figure 4:
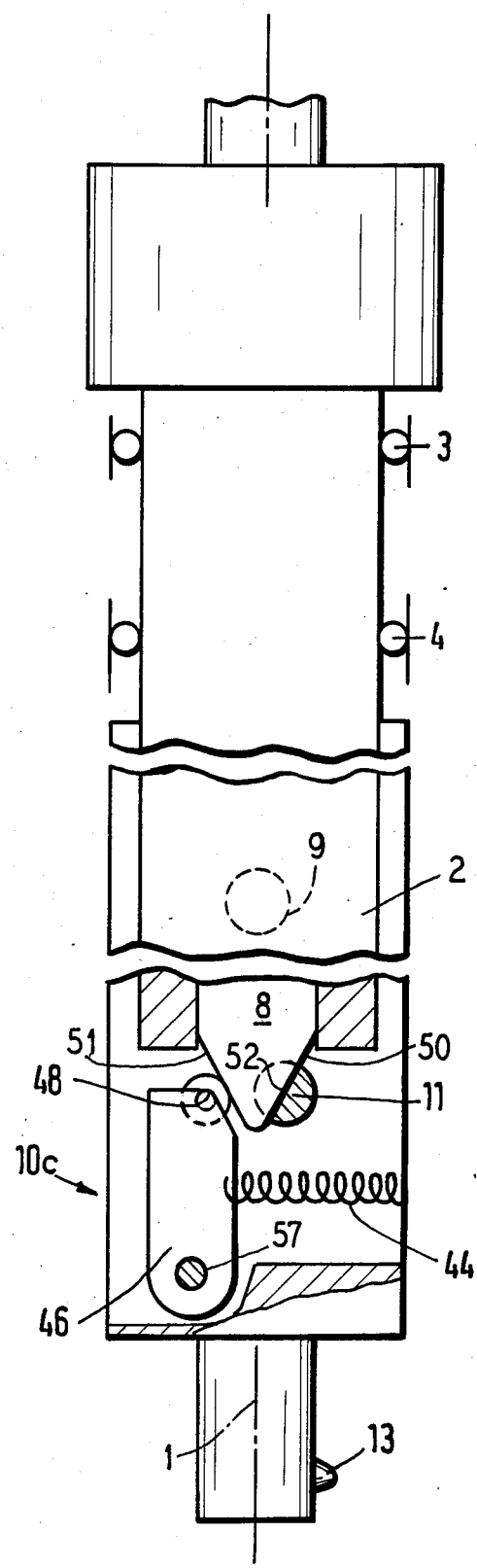
FIG. 4 is side view with portions broken away for purposes of illustration of another embodiment of the drilling head of the present invention.

Another embodiment of the drilling head is illustrated in FIG. 4. In this embodiment, a tool carrier 10c, similar to the tool carrier 10, is pivotally connected such as by pins 9 to a spindle 2. As in the previous embodiment, the carrier has a rod or member 11 having a sliding surface 52 for engaging a bevel such as 50 of the wedge carrier 8. The major difference in the structure of the embodiment of the tool carrier 10c is that the cylindrical member 12 has been replaced by a rod or lever 46 which is pivotally connected at one end 57 to the tool carrier 10c. At the other end, the member 46 has a roller 48. In addition, a tension spring 44 pulls the rod 46 toward the axis of rotation 1 so that the roller 48 engages a bevel 51 of the wedge carrier 8. In this embodiment, if the geometry and the mass of the body 46 are correct and when the tool carrier 10c shifts transversely to the rotational axis 1, the center of gravity of the carrier 10c always lies on or adjacent the axis 1 because the shifting of the tool carrier 10c is accompanied by a corresponding shifting of the member 46 in the opposite transverse direction.

The spring 44 should be rigid enough to insure that a considerable centrifugal force arising at high speeds and acting on the member 46 cannot disengage the same from the beveled surface 51 of the wedge carrier 8. A very rigid spring of this kind also insures that when the drilling head is stationary or running at a very slow speed, the member 46 is pressed onto the beveled surface 51 and the tool carrier 10c cannot shift accidentally relative to the rotational axis 1. Of course, the spring 44 can, as shown, be a tension spring or else a compression spring which bears on a surface of the tool carrier.

The features disclosed in the foregoing description, in the drawings and in the claims for each of the embodiments, can be important individually and in any combination for embodying the invention in its various forms. Thus, it should be understood that we wish to embody within the scope of the patent granted hereon, all such modifications as reasonably and properly come within the scope of our contribution to the art.

We claim:

1. In a rotating head or the like having a drilling spindle being rotated on an axis of rotation, a tool carrier, means for mounting the tool carrier on an end of the spindle including means for finely adjusting the position of the tool carrier transversely to the axis of rotation, said means for finely adjusting including a wedge carrier having a bevel at one end and being guided for movement in the drilling spindle along the axis of rotation, means for shifting the wedge carrier along the axis, and a sliding surface being provided on the tool carrier and cooperating with the bevel of the wedge carrier to adjust the transverse position of the tool carrier relative to the drilling spindle, said tool carrier having pressing means to urge the sliding surface against the bevel of the wedge carrier, the improvements comprising said pressing means including the center of gravity of the tool carrier being offset from the axis of rotation on a side opposite the position of the sliding surface so that centrifugal forces, which occur during rotation of the head, will press the sliding surface of the tool carrier onto the bevel of the wedge carrier.

2. In a rotating head according to claim 1, wherein the tool carrier includes means for adjusting the center of gravity of the tool carrier.

3. In a rotating head according to claim 2, wherein the means for adjusting the center of gravity includes a transversely extending bore in the tool carrier, and a cylindrical member having external threads received in the threaded bore.

4. In a rotating head according to claim 2, wherein the means for adjusting the center of gravity includes a lever member being pivotally mounted in the tool carrier at one end and having a roller at an opposite end acting on a second beveled surface of the wedge carrier so that movement of the wedge carrier causes pivoting of the lever.

5. In a rotating head according to claim 4, which further includes rigid spring means for pressing the roller of the member against the second beveled surface.

6. In a rotating head according to claim 1, wherein the sliding surface is provided in a segmented recess of a rod-shaped member mounted in an eccentric bore of the tool carrier.

7. In a rotating head according to claim 1, wherein the sliding surface is formed on a wedge-shaped projection provided on the tool carrier.

8. In a rotating head according to claim 1, wherein the inclination of the bevel and of the sliding surface are selected to produce a self-locking of the wedge carrier.

9. In a rotating head according to claim 1, wherein the tool carrier is formed by a link connected to the spindle by a parallel linkage of a plurality of lever arms.

10. In a rotating head according to claim 1, wherein the wedge carrier has a second bevel symmetrical to the first-mentioned bevel, said tool carrier being formed by two unconnected parts, said means for mounting the tool carrier mounting the two parts on the spindle to enable movement of each of the parts independent of the other, each of the moving parts having a sliding surface with the sliding surfaces facing each other and engaging the bevels so that movement of the wedge carrier toward the tool carrier causes a spreading of the two parts, each of the two parts having a center of gravity offset from the axis of rotation of the spindle on a side opposite the sliding surface of the part so that centrifugal forces acting on the parts urge the sliding surfaces into engagement with the bevels.

11. In a rotating head according to claim 10, wherein one of the two moving parts carries a tool and the other of the two moving parts carries a balancing plate.

12. In a rotating head according to claim 10, wherein each of the moving parts carries a tool.

13. In a rotating head according to claim 1, wherein the means for shifting the wedge carrier includes a piston slidably received in a cylinder and being urged against a compression spring by a hydraulic or pneumatic fluid.

14. In a rotating head according to claim 1, wherein the means for shifting the wedge carrier includes an electric motor.

15. In a rotating head according to claim 1, wherein the tool carrier supports a rapid tool changing system.

16. In a rotating head according to claim 1, wherein the means for maintaining the sliding surface on the bevel of the wedge carrier includes a member engaging the wedge carrier and a rigid spring pressing the member against the wedge carrier.

17. In a rotating head according to claim 16, wherein the member is pivotally mounted at one end to the tool carrier and at the opposite end has a roller acting on a surface of the wedge carrier.

18. In a rotating head or the like having a drilling spindle being rotated on an axis of rotation, a tool carrier, means for mounting the tool carrier on an end of the spindle including means for finely adjusting the position of the tool carrier transversely to the axis of rotation, the improvements comprising the tool carrier being formed by a link being connected to the spindle by a parallel linkage of a plurality of lever arms, the means for finely adjusting including a wedge carrier having a bevel at one end and being guided for movement in the drilling spindle along the axis of rotation, means for shifting the wedge carrier along the axis, and a sliding surface being provided on the tool carrier and cooperating with the bevel of the wedge carrier to adjust the transverse position of the tool carrier relative to the drilling spindle, said tool carrier having means to urge the sliding surface against the bevel of the wedge carrier.

* * * * *